June 19, 1928.
S. W. MERRICK
TREE COLLAR
Filed April 19, 1927
1,674,118
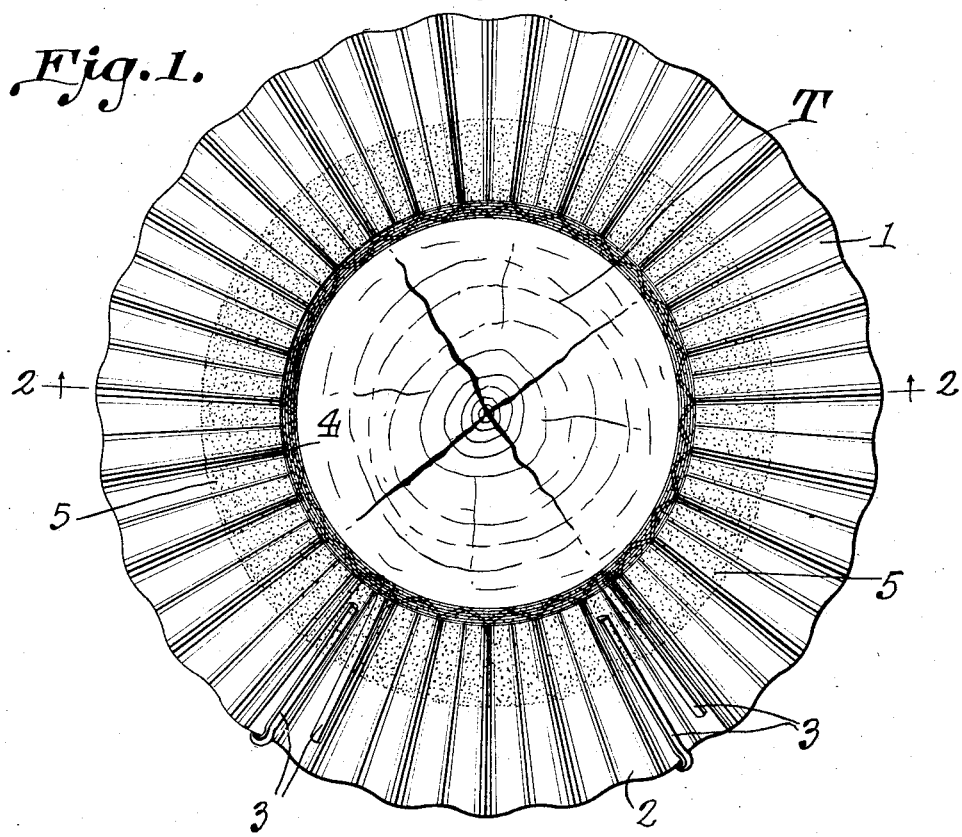
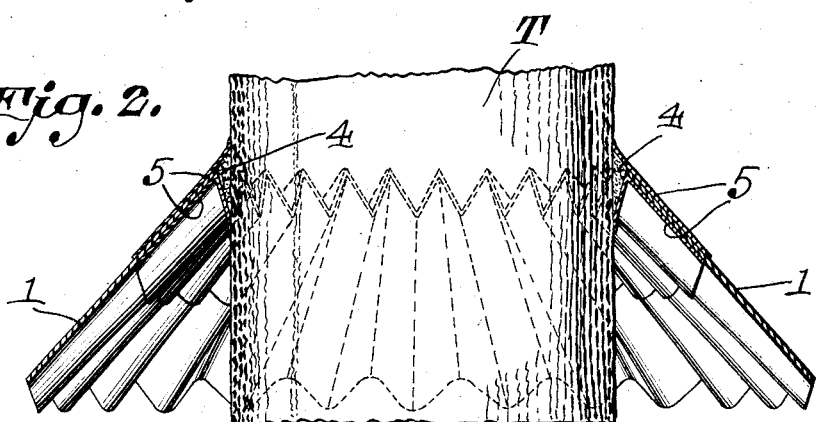
Samuel W. Merrick, Inventor
By C. A. Snow & Co.
Attorneys Patented June 19, 1928.

1,674,118

UNITED STATES PATENT OFFICE.

SAMUEL W. MERRICK, OF SEABECK, WASHINGTON.

TREE COLLAR.

Application filed April 19, 1927. Serial No. 184,961.

This invention relates to a collar for use around tree trunks for the purpose of protecting the foliage and fruit from climbing insects.

One of the objects of the invention is to provide a device of this character which can be shaped from sheet metal and which is readily adjustable to fit tree trunks of different diameters, the construction of the device also permitting it to expand as the tree trunk to which it is applied increases in size through natural growth.

A further object is to provide a device of this character which is cheap to manufacture and can be easily applied.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings, the preferred form of the invention has been shown.

In said drawings,

Figure 1 is a plan view showing the device in position, the tree trunk to which it is attached being shown in section.

Figure 2 is a vertical section through the collar the same being in position for use.

Referring to the figures by characters of reference 1 designates a sheet metal strip of any desired width provided with transverse corrugations extending throughout the length thereof, the said strip being adapted to fit around a tree trunk T and to incline downwardly and outwardly away from the trunk as shown particularly in Figure 2. If the ends of this strip do not come together when the strip is applied to the trunk, the space left therebetween is to be closed by a supplemental strip 2 corrugated transversely. The ends of the strips are disposed in lapped relation and are held together by means of spring clips 3 which can be in the form of cotter pins or the like slipped onto the lapping edges of the strips from the outer and from the inner edges thereof as shown. The corrugations at the ends of one strip will fit into the corrugations at the adjoining ends of the other strip. Although the device has been shown and described as formed of two strips of corrugated metal it is to be understood it can be made of one or more than one strip if preferred.

In practice the collar is placed around the trunk of the tree so that the inner edges of the strips 1 and 2 will engage the surface of the tree trunk. After the collar has been thus arranged with the ends of the strips 1 and 2 lapping and held together by the clips 3 or other suitable means, a packing of oakum or other suitable material is placed between the surface of the trunk and the edges of the collar at the inner ends of the corrugations. A coating of asphaltum or other suitable sticky adhesive is then applied to the exposed surfaces of the oakum as well as to the adjacent surfaces of the collar. In the drawing the oakum packing has been indicated at 4 while the coating material of asphaltum or the like has been indicated at 5.

It has been found in practice that a collar constructed and applied as described will constitute an efficient guard to prevent climbing insects from reaching the foliage or fruit of trees. Furthermore the sealing connection between the tree trunk and the collar will serve to prevent any insect from climbing along the tree trunk.

What is claimed is:

A tree collar including a band of resilient sheet metal having lapping interfitting ends, said band being provided with transverse corrugations increasing in depth to one edge of the band, the ends of the corrugations at said edge being adapted to grip a tree or the like and support the collar with the corrugations diverging downwardly, a clip for holding the interfitting lapping portions of the band together, a packing for filling the interstices between the tree engaging ends of the corrugations and the surface engaged thereby, and a cement coating upon the exposed surfaces of packing and adjacent portions of the band.

In testimony that I claim the foregoing as my own, I have hereto affixed my signature.

SAMUEL W. MERRICK.